United States Patent Office 3,065,191
Patented Nov. 20, 1962

3,065,191
DISULPHO-1-AMINO-4-(OXY-, THIO-, OR AMINO-SUBSTITUTED - MONOHALOGENOTRIAZINYL-AMINO-ARYL- OR ARYLAZO-AMINO) ANTHRA-QUINONE DYESTUFFS
Robert Norman Heslop and Charles Hugh Reece, Manchester, England, assignors to Imperial Chemical Industries Limited, London, England, a corporation of Great Britain
No Drawing. Filed July 18, 1958, Ser. No. 749,341
Claims priority, application Great Britain July 22, 1957
6 Claims. (Cl. 260—153)

This invention relates to new anthroquinonoid dyestuffs, and more particularly it relates to new anthraquinonoid dyestuffs which possess excellent solubility and are valuable for the production of fast colourations on cellulosic textile materials.

In our copending U.K. application No. 34,501/54 and the corresponding published Belgian specification No. 543,216, there are described new anthraquinonoid dyestuffs which, in the form of their free acids, are of the formula:

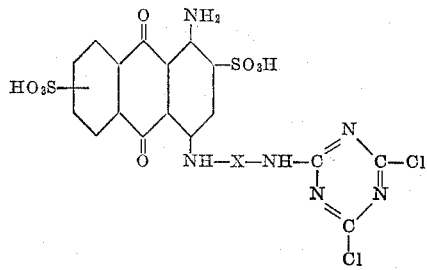

wherein X stands for a bridging group containing at least one anionic solubilising group.

The present invention is a modification of or improvement in the invention described in the aforesaid application. We have now found that valuable dyestuffs for cellulosic textile materials may be obtained by replacing the cyanuric chloride used in the process of the said application by certain other dihalogeno-1:3:5-triazines.

According to the present invention, we provide new anthraquinonoid dyestuffs which, in the form of their free acids, are represented by the formula:

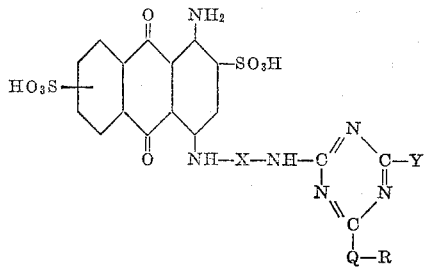

Formula 1 wherein X stands for a bridging group containing at least one anionic solubilising group,
Y stands for a chlorine or a bromine atom,
Q stands for an oxygen atom, a sulphur atom or a grouping of the formula —$NR_1$—, and R and $R_1$ may be the same or different and R stands for a hydrogen atom, or a hydrocarbon or substituted hydrocarbon radical having no dyestuff character and $R_1$ stands for a hydrogen atom or an alkyl or substituted alkyl radical.

As examples of hydrocarbon or substituted hydrocarbon radicals represented by R in the above formula, there may be mentioned alkyl or substituted alkyl, for example methyl and beta-ethoxyethyl, cycloalkyl, for example cyclohexyl, aralkyl, for example benzyl, aryl, for example phenyl, tolyl, chlorophenyl and sulphophenyl. $R_1$ may represent an alkyl or substituted alkyl radical as exemplified above; as a special case of substituted alkyl, R and $R_1$ may be joined together to form, with the nitrogen atom, a saturated heterocyclic radical such as N-morpholino.

In the above formula, X preferably represents an arylene bridging group and in particular a bridging group such that the attached amino groups are linked to the same or different arylene radicals preferably monocyclic arylene radicals, that is to say to phenylene or substituted phenylene radicals. Thus, X may represent, for example, a —$C_6H_4$— group, a —$C_4H_6$—$C_4H_6$— group, a —$C_6H_4$—N=N—$C_6H_4$— group each of which is substituted by at least one anionic solubilising group such as a sulphonic acid or carboxylic acid group and which may be further substituted by, for example, methyl, methoxy and chloro groups.

According to a further feature of the invention there is provided a process for the manufacture of new anthraquinonoid dyestuffs which comprises interacting a cyanuric halide, on the one hand with an aminoathraquinone compound of the formula:

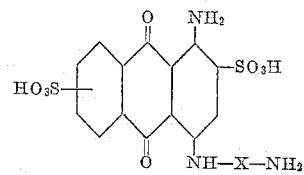

Formula 2 wherein X has the meaning given above, and on the other hand with a compound of the formula H—Q—R wherein Q and R have the meanings given above, under such conditions that the resultant product still contains a halogen atom attached to the triazine ring.

The aminoanthraquinone compounds used in the above process, for example, 1-amino-4-(4′-aminoanilino)-anthraquinone-2:3′:5-trisulphonic acid, may be obtained as described in Belgian specification No. 543,216.

Suitable compounds of the formula H—Q—R for use in the above process include colourless primary or secondary amines, hydroxy or mercapto compounds having the formula $RNHR_1$, ROH or RSH respectively. Examples of such compounds include, for example, methanol, ethanol, iso-butanol, octanol, betaethoxyethanol, cyclohexanol, benzyl alcohol, phenylethyl alcohol, phenol, o-, m- and p-cresols, xylenols, chlorophenols, sulphophenols, dialkylaminophenols, sulphonaphthols, ammonia, methylamine, diethylamine, hydroxyethylamine, taurine, glycine, benzylamine, cyclohexylamine, aniline, toluidine, chloroaniline, anisidine, aminoacetanilide, orthanilic, metanilic and sulphanilic acids, thiophenol, thiocresol and p-sulphothiophenol.

The process of the invention is advantageously carried out in the presence of an acid-binding agent, preferably a carbonate or a bicarbonate. It is carried out under such conditions that the final product still contains a single halogen atom attached to the triazine ring, that is, for example, in an organic solvent or preferably at a relatively low temperature in an aqueous medium. In general, the process is preferably carried out at a temperature between 15° and 50° C. and at a pH between 4 and 7 in aqueous medium.

The new anthraquinonoid dyestuffs may readily be precipitated in the form of their sodium salts by adding common salt to the neutral aqueous medium, and may then be isolated for example, by filtration and drying.

The new anthraquinonoid dyestuffs are valuable dyestuffs for cellulose textile materials when applied in conjunction with an acid-binding agent, for example by the process described in Belgian specification No. 543,219, wherein the coloured textile material is after-treated with an acid-binding agent, or by related processes wherein an acid-binding agent is applied to the textile material before or during the treatment with the dyestuff.

The new anthraquinonoid dyestuffs may also be used to colour textile materials of wool, silk and other natural protein fibres and also artificial fibres such as fibres of ardein, casein, polyamide or modified polyacrylonitrile, by the methods commonly used for the dyeing and printing of such textile materials, for example by treating the textile material with a hot neutral or weakly acid aqueous solution of the dyestuff.

When so applied the new anthraquinonoid dyestuffs give greenish-blue and green shades very fast to washing, and to light. The new anthraquinonoid dyestuffs have an advantage over the dyestuffs described in Belgian specification No. 543,216 in that they are more stable in the presence of acid-binding agents. Thus thickened printing pastes containing the new anthraquinonoid dyestuffs and an acid-binding agent are especially valuable for use in the printing process of Belgian specification No. 543,219.

The invention is illustrated but not limited by the following examples in which parts and percentages are by weight:

*Example 1*

A solution of 5.0 parts of 2:4-dichloro-6-methoxy-s-triazine in 24 parts of acetone is added gradually to a stirred mixture of 100 parts of water and 100 parts of crushed ice. The suspension so obtained is warmed to 30° C. and a solution of 15.9 parts of the trisodium salt of 1 - amino - 4 - (4'-aminoanilino)anthraquinone-2:3':5-trisulphonic acid in 250 parts of water is added during about 1 hour the temperature of the reaction mixture being maintained at from 30 to 32° C. during the addition. The mixture is then stirred for 45 minutes at the same temperature, then cooled to 20° C. and neutralised to litmus by the gradual addition of 10% aqueous sodium carbonate solution. Sufficient sodium chloride is then added to the mixture to give a concentration of 200 grams per litre and the mixture is stirred until precipitation of the dyestuff is complete. The dyestuff is then filtered off, washed on the filter with 20% sodium chloride solution and dried at atmospheric temperature.

The dyestuff so obtained forms a dark blue powder, possessing good solubility in water; when applied to cellulosic fibres by the methods described above, it yields greenish-blue shades having very good fastness to washing and to light.

*Example 2*

A solution of 15.9 parts of the trisodium salt of 1-amino - 4 - (4' - aminoanilino)anthraquinone - 2:3':5-trisulphonic acid in 300 parts of water is added slowly during 30 minutes to a stirred suspension of 4.6 parts of cyanuric chloride in 50 parts of acetone and 100 parts of water at 0°–2° C. The reaction mixture during the addition is kept at between 0 and 5° by cooling and at a pH between 5 and 7 by the simultaneous addition of 2 N-sodium carbonate solution.

The reaction mixture is then stirred for one hour at from 2 to 5° C. The pH of the reaction mixture is then adjusted to 6 and 75 parts of sodium chloride are added. The mixture is filtered and the residue on the filter is washed with 200 parts of 15% aqueous sodium chloride and then stirred with 800 parts of water and 3 parts of 27% aqueous ammonia solution for four hours at between 15° and 20° C. and 120 parts of sodium chloride are added. The mixture is filtered and the residue on the filter is washed with 200 parts of 15% aqueous sodium chloride solution and dried at between 20 and 25° C. The new anthraquinonoid dyestuff so obtained is a dark blue powder which dissolves in cold water giving a blue solution and in concentrated sulphuric acid giving a bluish red solution. When applied to cellulose fibres by the methods described above it gives greenish blue dyeings which have very good fastness to washing and to light.

*Example 3*

A solution of 4.48 parts of 2-beta-methoxyethoxy-4:6-dichloro-s-triazine in 100 parts of acetone is added to 500 parts of water keeping the temperature below 15° C. A solution of 16.78 parts of the tetra sodium salt of 1-amino-4 - (4' - [4''-aminostyryl]anilino)-anthraquinone-2:2'':3': 5-tetrasulphonic acid in 1000 parts of water is added to this suspension during 30 minutes keeping the temperature between 15 and 20° C. and the reaction mixture is stirred for a further two hours at a temperature between 20 and 25° C. During this time 10% aqueous sodium carbonate solution is added to keep the pH of the reaction mixture between 5 and 7. The pH of the reaction mixture is finally adjusted to 7 and 250 parts of sodium chloride are added. The precipitated dyestuff is then filtered off, washed with 200 parts of 15% aqueous sodium chloride solution and dried at 20° C. The new dyestuff is obtained as a dark green powder which dissolves in sulphuric acid giving a bluish red solution and in water to give a greenish blue solution. It gives bluish green shades on cellulose fibres which have very good fastness to washing and to light.

*Example 4*

A solution of 14.22 parts of the trisodium salt of 1-amino - 4 - (4' - [4'' - aminophenyl] - anilino) - anthraquinone 2:3'':5-trisulphonic acid in 600 parts of water is added during 30 minutes to a stirred suspension of 3.69 parts of cyanuric chloride in 40 parts of acetone and 80 parts of water at a temperature between 0 and 8° C., the pH being maintained between 5 and 7 by the addition of 10% aqueous sodium carbonate solution. The reaction mixture is stirred for two hours the pH of the solution being finally adjusted to 7. A solution of 3.9 parts of sodium metanilate in 20 parts of water is added and the reaction mixture is heated to a temperature between 30 and 35° C. and stirred for four hours, further quantities of 10% aqueous sodium carbonate solution being added to keep the pH between 7 and 8. The pH is finally adjusted to 8 and 40 parts of sodium chloride are added. The precipitated dyestuff is filtered off, washed with 200 parts of 5% aqueous sodium chloride solution and dried at 20° C. The new dyestuff is obtained as a dark green powder which dissolves in concentrated sulphuric acid to give a bluish red solution and in water to give a greenish blue solution. It gives greenish blue shades on cellulose which have very good fastness to washing and to light.

*Example 5*

To a solution of 15.66 parts of the trisodium salt of 1 - amino - 4 - (4' - [4'':6'' - dichloro - s - triazin - 2''ylamino]anilino)anthraquinone-2:3':5-trisulphonic acid (obtained as described in the first paragraph of Example 2) in 300 parts of water at 5° C. is added a solution of 3.46 parts of sodium-4-acetylamino phenate in 20 parts of water during 1 hour. During the addition the temperature is allowed to rise to 20° C. The temperature is then raised to between 35 and 40° C. and the solution is stirred for 2 hours. 30 parts of sodium chloride are added and the precipitated dyestuff is filtered off, washed with 200 parts of 10% aqueous sodium chloride solution and dried at 20° C. The new dyestuff is obtained as a dark blue powder which dissolves in concentrated sulphuric acid giving a bluish red solution and in water to give a greenish blue solution. It gives greenish blue shades on cellulose materials which have very good fastness to washing and to light.

The following table gives the shades of further example of the new anthraquinone dyestuffs, obtained by reacting together substantially equimolecular proportions of the aminoanthraquinone compound of column I, the compound named in column II and cyanuric chloride.

| | I | II | Shade on cellulose |
|---|---|---|---|
| (6) | 1-amino-4-(4'-aminoanilino)-anthraquinone 2:3':5-trisulphonic acid. | phenol | greenish blue. |
| (7) | ----do---- | thio-p-cresol | Do. |
| (8) | ----do---- | o-cresol | Do. |
| (9) | ----do---- | 4-methoxy-phenol. | Do. |
| (10) | ----do---- | 3-(N:N-diethyl amino)-phenol. | Do. |
| (11) | ----do---- | 3-sulphoaniline | Do. |
| (12) | 1-amino-4-(4'-aminoanilino) anthraquinone-2:3':6-trisulphonic acid. | methanol | Do. |
| (13) | 1 amino-4-(4'-[4''-aminobenzene azo]anilino)anthraquinone-2:2'':5-trisulphonic acid. | 3-sulphoaniline | olive green |

What we claim is:
1. Dyestuffs which, in the form of their free acids, are represented by the formula:

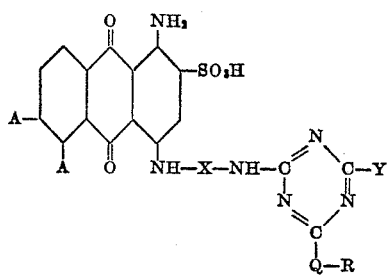

wherein:
X is a radical selected from the group consisting of phenylene, biphenylene and phenylene azo phenylene radicals, each of which is substituted by a member selected from the class consisting of sulfonic acid and carboxylic acid groups;
One A stands for a sulfonic acid substituent and the other A stands for a hydrogen atom;
Y is selected from the group consisting of chlorine and bromine,
Q is selected from the group consisting of oxygen, sulfur, and —NH—, and
R is selected from the group consisting of hydrogen, lower alkyl, lower alkoxy-lower alkylene, and benzene radicals.

2.

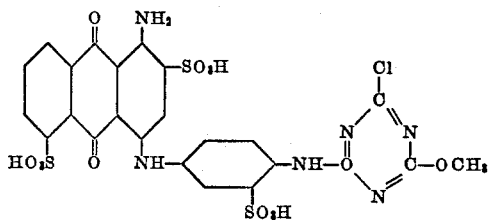

3.

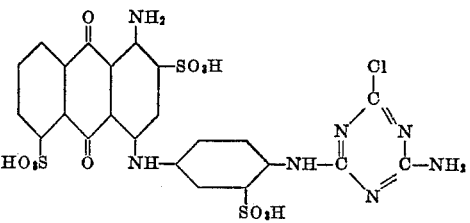

4.

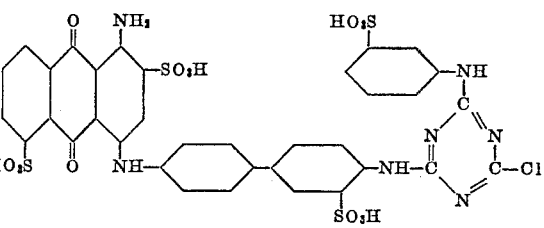

5.

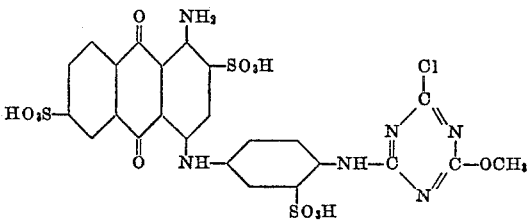

6.

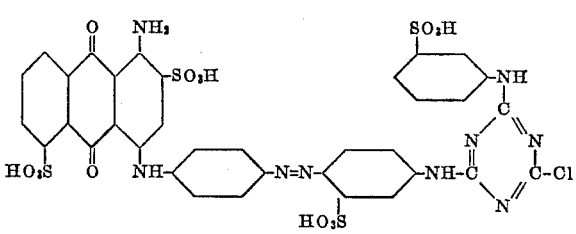

References Cited in the file of this patent
UNITED STATES PATENTS

| 2,773,871 | Brassel et al. | Dec. 11, 1956 |
| 2,795,576 | Fasciati | June 11, 1957 |
| 2,892,670 | Alsberg et al. | June 30, 1959 |

FOREIGN PATENTS

| 467,815 | Great Britain | June 23, 1935 |
| 740,660 | Great Britain | Nov. 16, 1955 |

OTHER REFERENCES

Grunthard: American Dyestuff Reporter, Jan. 14, 1957, pp. 9–21.
German Application 1,017,303, printed Oct. 10, 1957 (Kl. 22b 3/02).